United States Patent [19]

Torii

[11] Patent Number: 4,810,874
[45] Date of Patent: Mar. 7, 1989

[54] RADIATION IMAGE READ-OUT APPARATUS AND CASSETTE USED FOR THE SAME

[75] Inventor: Shumpeita Torii, Kanagawa, Japan
[73] Assignee: Fuji Photo Film Co., Ltd., Kanagawa, Japan
[21] Appl. No.: 947,224
[22] Filed: Dec. 29, 1986

[30] Foreign Application Priority Data

Dec. 27, 1985 [JP] Japan ................. 60-299846
Dec. 27, 1985 [JP] Japan ................. 60-299847

[51] Int. Cl.⁴ ............................................. G03B 42/02
[52] U.S. Cl. ................................ 250/327.2; 378/185
[58] Field of Search ............. 250/327.2, 484.1; 378/182, 185, 171

[56] References Cited

U.S. PATENT DOCUMENTS 4,061,923 12/1977 Van Der Does ............... 378/171
4,313,538 2/1982 Bauer et al. .................. 378/182

FOREIGN PATENT DOCUMENTS 0178674 4/1986 European Pat. Off. .......... 250/327.2
0568325 1/1933 Fed. Rep. of Germany ...... 378/171

Primary Examiner—Craig E. Church
Assistant Examiner—Richard Hanig
Attorney, Agent, or Firm—Sughrue, Mion, Zinn, Macpeak & Seas

[57] ABSTRACT

A radiation image read-out apparatus for scanning a stimulable phosphor sheet, which has been subjected to image recording in the form housed in a cassette, with stimulating rays which cause the stimulable phosphor sheet to emit light in proportion to the stored radiation energy, and photoelectrically detecting the emitted light to read out a radiation image stored on the stimulable phosphor sheet comprises a conveyance device and a shutter movement device. The conveyance device conveys a cassette, which is constituted by a cassette body housing the stimulable phosphor sheet and a light shielding shutter slideable on the cassette body, in a direction normal to the scanning direction of stimulating rays. The shutter movement device moves the light shielding shutter with respect to the cassette body to lay the stimulable phosphor sheet bare at a scanning position of stimulating rays as the cassette is conveyed.

10 Claims, 3 Drawing Sheets

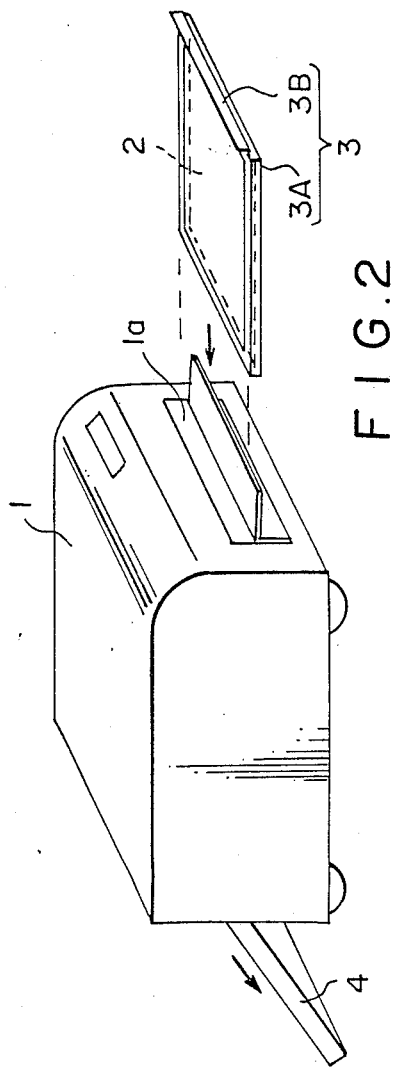
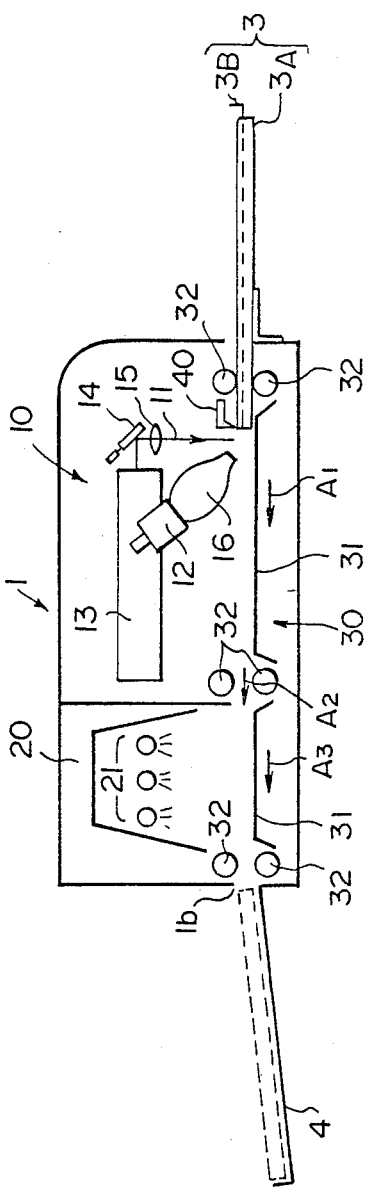

FIG. 5
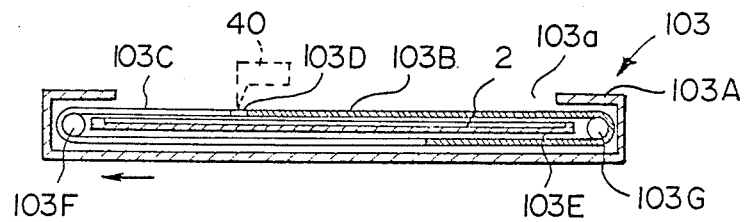
FIG. 6A
FIG. 6B
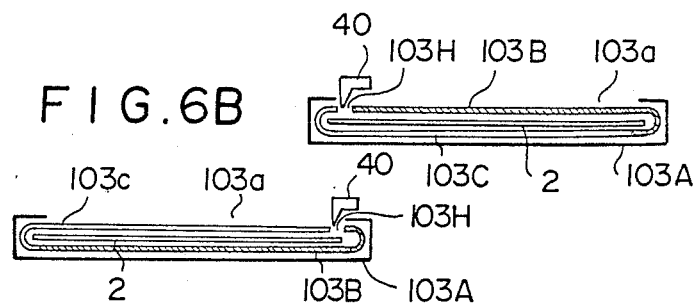

RADIATION IMAGE READ-OUT APPARATUS AND CASSETTE USED FOR THE SAME

BACKGROUND OF THE INVENTION

1. Field of the Invention

This invention relates to a radiation image read-out apparatus for use in a radiation image recording and reproducing system. This invention particularly relates to a radiation image read-out apparatus wherein image read-out from a stimulable phosphor sheet carrying a radiation image stored thereon in the form housed in a cassette is conducted without taking the stimulable phosphor sheet out of the cassette. This invention also relates to a cassette for use in the radiation image read-out apparatus.

2. Description of the Prior Art

When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. Nos. 4,258,264, 4,276,473, 4,315,318 and 4,387,428 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet or simply as a sheet) is first exposed to a radiation passing through an object to have a radiation image of the object stored thereon, and is then scanned with stimulating rays such as a laser beam which cause it to emit light in proportion to the stored radiation energy. The light emitted by the stimulable phosphor sheet upon stimulation thereof is photoelectrically detected and converted to an electric image signal, and the radiation image of the object is reproduced as a visible image by use of the image signal on a recording material such as a photographic film, a display device such as a cathode ray tube (CRT), or the like.

In the aforesaid radiation image recording and reproducing system, the stimulable phosphor sheet is used to temporarily store a radiation image until the sheet is scanned with stimulating rays for reading out the radiation image. Therefore, after the radiation image is read out from the stimulable phosphor sheet, radiation energy remaining thereon should be erased to reuse the sheet. For satisfying this requirement, it has been proposed to provide a radiation image read-out apparatus with a read-out section for reading out an image stored on a stimulable phosphor sheet, and an erasing section for erasing radiation energy remaining on the sheet.

To the proposed radiation image read-out apparatus, a stimulable phosphor sheet housed in a cassette and subjected to image recording by use of an external image recording apparatus is fed in the form housed in the cassette. When the cassette housing the sheet carrying a radiation image stored thereon is fed to the read-out apparatus, the sheet is taken out of the cassette in the read-out apparatus and transferred to a sheet conveyance means for conveying the sheet to the read-out section for conducting image read-out.

In the conventional radiation image read-out apparatus, the taking-out of the sheet from the cassette is generally done by opening a cover member of the cassette, which is openably mounted on a cassette body housing the sheet and is parallel to the sheet surface, by an opening member provided in the read-out apparatus, and then taking the sheet out of the cassette body and transferring it to the adjacent sheet conveyance means by use of a suction means. However, in order to conduct the taking-out of the sheet in this manner, it is necessary to provide the suction means for sucking up the sheet and transferring the sheet to the sheet conveyance means, and the mechanism of the apparatus becomes complicated. Also, since it is necessary to provide the apparatus with a space for opening and closing of the cover member of the cassette and a space for moving the suction means, a problem of the apparatus becoming large arises. Further, since the sheet is taken out of the cassette by being sucked up by the suction means and conveyed in the apparatus by being gripped between rollers, belts or the like, the sheet is readily scratched or damaged, and the service life of the sheet becomes short.

SUMMARY OF THE INVENTION

The primary object of the present invention is to provide a radiation image read-out apparatus for conducting image read-out from a stimulable phosphor sheet subjected to image recording in the form housed in a cassette, which conducts image read-out without taking the sheet out of the cassette, and which has a simple mechanism and is small.

Another object of the present invention is to provide a radiation image read-out apparatus for conducting image read-out from a stimulable phosphor sheet subjected to image recording in the form housed in a cassette, which prevents the sheet from being scratched or damaged by the taking-out of the sheet from the cassette and sheet conveyance.

The specific object of the present invention is to provide a cassette suitable for use in the radiation image read-out apparatus.

The present invention provides a radiation image read-out apparatus for scanning a stimulable phosphor sheet, which has been subjected to image recording in the form housed in a cassette, with stimulating rays which cause said stimulable phosphor sheet to emit light in proportion to the stored radiation energy, and photoelectrically detecting the emitted light to read out a radiation image stored on said stimulable phosphor sheet, the radiation image read-out apparatus comprising:

(i) a conveyance means for conveying a cassette, which is constituted by a cassette body housing said stimulable phosphor sheet and a light shielding shutter slideable on said cassette body, in a direction normal to the scanning direction of said stimulating rays, and (ii) a shutter movement means for moving said light shielding shutter with respect to said cassette body to lay said stimulable phosphor sheet bare at a scanning position of said stimulating rays as said cassette is conveyed.

The present invention also provides a cassette for housing a stimulable phosphor sheet for storing an image thereon, the cassette comprising:

(i) a cassette body for housing said stimulable phosphor sheet and having an opening of a size capable of laying the whole surface of said stimulable phosphor sheet bare, (ii) a sheet supporting means for supporting said stimulable phosphor sheet at the position of said opening, and (iii) a belt member disposed in said cassette body, composed of a light shielding belt having a size not smaller than the surface of said stimulable phosphor sheet, and a transparent film having a size not smaller than the surface of said stimulable phosphor sheet, said light shielding belt and said transparent film being joined to constitute a ring-like form and surround front and rear surfaces of said stimulable phosphor sheet, and provided with a slit formed at the junction between said light shielding belt and said transparent film, said belt member being circulatable and moveable around said stimulable phosphor sheet.

With the radiation image read-out apparatus using the cassette in accordance with the present invention, since image read-out is conducted without taking the stimulable phosphor sheet out of the cassette, the cover member opening and closing means and the sheet suction means become unnecessary, and the configuration of the apparatus is simplified. Also, since movement spaces for these means are unnecessary, the apparatus becomes small. Further, since the stimulable phosphor sheet is not subjected to sucking by a suction means and conveyance by being gripped between rollers or the like, there is no risk of the sheet being scratched or damaged by such operations, and it is possible to prolong the service life of the sheet. In the case where image recording is conducted repeatedly, since it is unnecessary to conduct loading of the erased sheet into a cassette, it is possible to simplify the whole system and to decrease the cost thereof. Thus the cassette in accordance with the present invention is very advantageous in practice.

BRIEF DESCRIPTION OF THE DRAWINGS

FIG. 1 is a perspective view showing an embodiment of the radiation image read-out apparatus in accordance with the present invention, FIG. 2 is a schematic side view showing the embodiment of FIG. 1, FIG. 5 is a sectional view taken along line A—A of FIG. 4, and FIGS. 6A and 6B are schematic views showing the relationship between the position of the cassette body of the cassette shown in FIG. 5 and the light shielding belt.

DESCRIPTION OF THE PREFERRED EMBODIMENTS

Figure 3:
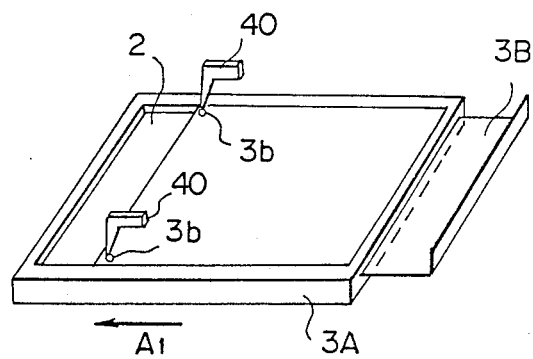
FIG. 3 is a perspective view showing an embodiment of the cassette used in the apparatus of FIG. 1.

The present invention will hereinbelow be described in further detail with reference to the accompanying drawings.

Referring to FIGS. 1 and 2, a cassette 3 comprises a cassette body 3A housing a stimulable phosphor sheet 2 and opening approximately over the whole upper surface, and a light shielding shutter 3B slideable on the upper surface of the cassette body 3A for opening and closing the opening of the cassette body 3A. After the sheet 2 housed in the cassette 3 is subjected to image recording in an external image recording apparatus, the cassette 3 is fitted to a radiation image read-out apparatus 1 horizontally from an inlet 1a formed at one side end face of the read-out apparatus 1. As shown in FIG. 2, the read-out apparatus 1 is provided with a read-out section 10 for reading out an image stored on the sheet 2, and an erasing section 20 for erasing radiation energy remaining on the sheet 2 after the image read-out. The read-out apparatus 1 is also provided with a conveyance means 30 comprising a guide plate 31 and conveying rollers 32, 32, . . . for conveying the cassette 3 housing the sheet 2 to the read-out section 10 and then to the erasing section 20, and conveying the cassette 3 housing the erased sheet 2 from an outlet 1b formed at the other side end face of the read-out apparatus 1 into a tray 4 extending from the read-out apparatus 1.

At the read-out section 10, the sheet 2 carrying a radiation image stored thereon is scanned with stimulating rays 11 such as a laser beam which cause the sheet 2 to emit light in proportion to the stored radiation energy, and the emitted light is photoelectrically detected by a photoelectric read-out means 12 constituted by a photomultiplier or the like to obtain an electric image signal for use in reproduction of a visible image. Reference numeral 13 denotes a stimulating ray source, and reference numeral 14 denotes a light deflector such as a galvanometer mirror. Reference numeral 15 designates a scanning lens such as an fθ lens, and reference numeral 16 designates a light guide member for guiding the light emitted by the sheet 2 through total reflection to the photoelectric read-out means 12.

When the cassette 3 is fitted to the read-out apparatus 1 from its inlet 1a, the cassette 3 is in such a form that the sheet 2 housed therein is covered by the light shielding shutter 3B. Therefore, in order to conduct image read-out from the sheet 2 at the read-out section 10, it is necessary to slide the light shielding shutter 3B to lay bare the sheet 2 at the opening of the cassette body 3A. Accordingly, in this embodiment, engagement claws 40, 40 acting as a shutter movement means for moving the light shielding shutter 3B with respect to the cassette body 3A to lay bare the sheet 2 at the scanning position of the stimulating rays 11 are disposed at positions near the inlet 1a where the leading end of the light shielding shutter 3B is disposed when the cassette 3 is fed to the read-out apparatus 1. As shown in FIG. 3, by way of example, two engagement claws 40, 40 are provided to engage with engagement holes 3b, 3b formed in the light shielding shutter 3B. By engagement with the engagement holes 3b, 3b, the engagement claws 40, 40 make the light shielding shutter 3B stop at the position where it was disposed when the cassette 3 was fitted to the read-out apparatus 1. The cassette 3 fitted to the read-out apparatus 1 is then conveyed by the conveyance means 30 in the direction as indicated by the arrow A1 inside of the read-out section 10. At this time, since the light shielding shutter 3B is retained at the initial position by the engagement claws 40, 40, only the cassette body 3A is conveyed by the conveyance means 30. As the cassette body 3A is conveyed, the sheet 2 in the cassette 3 is gradually laid bare, and the bared sheet 2 is exposed to the stimulating rays 11. The stimulating rays 11 are deflected approximately normal to the conveyance direction of the cassette 3 as indicated by the arrow A1. As a result, the whole surface of the sheet 2 housed in the cassette body 3A is two-dimensionally scanned by the stimulating rays 11 and caused to emit light in proportion to the stored radiation energy. The emitted light is detected by the photoelectric read-out means 12, and image read-out is conducted in this manner.

When the image read-out from the sheet 2 is finished at the read-out section 10, the sheet 2 is conveyed in the form housed in the cassette body 3A by the conveyance means 30 in the direction as indicated by the arrow A2 to the erasing section 20.

At the erasing section 20, radiation energy remaining on the sheet 2 after the image read-out is finished is erased. Specifically, though most of the radiation energy stored on the sheet 2 at the image recording step is released during the image read-out, a part of the stored radiation energy remains stored thereon after the image read-out is finished. In order to reuse the sheet 2, the residual radiation energy is erased at the erasing section 20. For this purpose, any erasing method may be used. In this embodiment, the erasing section 20 is provided with a plurality of erasing light sources 21, 21, . . . constituted by fluorescent lamps, tungsten-filament lamps, sodium lamps, xenon lamps, iodine lamps or the like. While the sheet 2 is conveyed in the direction as indicated by the arrow A3, the sheet 2 is exposed to erasing light emitted by the erasing light sources 21, 21, . . . for releasing the residual radiation energy from the sheet 2. While the cassette body 3A is conveyed from the read-out section 10 to the erasing section 20, the cassette body 3A is separated from the light shielding shutter 3B engaging with the engagement claws 40, 40. Therefore, the whole surface of the sheet 2 in the cassette body 3A is exposed to the erasing light. After erasing of the sheet 2 in the cassette body 3A is conducted while the cassette body 3A is conveyed through the erasing section 20, the cassette body 3A thus separated from the light shielding shutter 3B is ejected from the outlet 1b into the tray 4. Specifically, the cassette body 3A is conveyed by the conveying rollers 32, 32 disposed in the vicinity of the outlet 1b to the tray 4. After the cassette body 3A is separated from the conveying rollers 32, 32, it falls by its own weight to the holding position in the tray 4 and is held in the tray 4.

After the cassette body 3A housing the sheet 2 for which image read-out and erasing have been finished is ejected into the tray 4, the light shielding shutter 3B engaging with the engagement claws 40, 40 is pulled out of the read-out apparatus 1. The light shielding shutter 3B is then fitted to the cassette body 3A, and the cassette 3 is returned to th original condition in which the upper surface of the cassette body 3A is covered by the light shielding shutter 3B. The cassette 3 having the light shielding shutter 3B fitted thereto may then be used for image recording in an image recording apparatus.

As mentioned above, with this embodiment, since image read-out is conducted by moving the light shielding shutter 3B with respect to the cassette body 3A and gradually laying bare the sheet 2 in the cassette body 3A without taking the sheet 2 out of the cassette 3, it is possible to eliminate complicated and space-requiring mechanisms for opening and closing the cover member of a cassette and for swinging of a suction arm which are necessary in the conventional radiation image read-out apparatus. As a result, it becomes possible to simplify the apparatus configuration and to make the apparatus small. Also, with this embodiment, it is unnecessary to conduct the operation for loading the sheet, which has been taken out of the cassette and subjected to the image read-out, into the cassette for use in image recording after the erasing is finished as in the conventional radiation image read-out apparatus. Therefore, the apparatus and means for the sheet loading into the cassette become unnecessary, and the whole image recording and read-out system is simplified. Further, since sheet suction for unloading and loading of the sheet into the cassette becomes unnecessary and the sheet itself need not be gripped between rollers or the like for conveyance in the apparatus, there is no risk of the sheet being scratched or damaged, and it is possible to prolong the service life of the sheet. Also, because the sheet portion on which image read-out has not been finished at the read-out section 10 remains covered by the light shielding shutter 3B, it is possible to prevent the problem that the sheet portion prior to the image read-out will be exposed undesirably to the stimulating rays reflected by some sections of the read-out apparatus 1, and to accurately conduct the image read-out. In the case where erasing is to be conducted at an independent erasing apparatus for minimizing the size of the read-out apparatus 1, the erasing section 20 may be omitted, and only the read-out section 10 may be disposed in the read-out apparatus 1.

Figure 4:
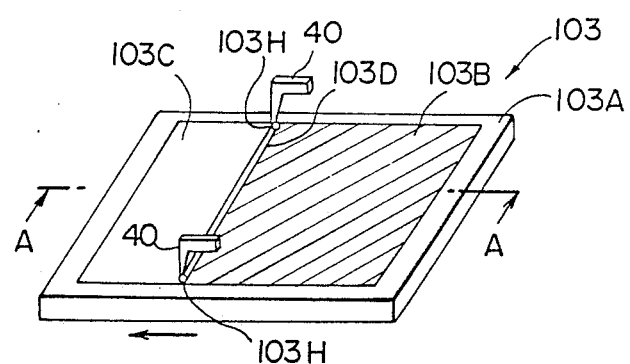
FIG. 4 is a perspective view showing another embodiment of the cassette used in the apparatus of FIG. 1.

FIGS. 4 and 5 show another embodiment of the cassette used in the radiation image read-out apparatus of the present invention. A cassette 103 shown in FIGS. 4 and 5 comprises a cassette body 103A housing the sheet 2 and having an opening 103a capable of laying bare the whole surface of the sheet 2 at the upper surface. The sheet 2 is fixed to a sheet supporting means 103E which is a plate-like member secured to the cassette body 103A, and is supported at the position overlapping the opening 103a. A belt member comprising a light shielding belt 103B acting as the light shielding shutter and a transparent film 103C which are joined together to form a ring-like shape is disposed in the cassette body 103A so that the belt member surrounds the sheet 2. The light shielding belt 103B and the transparent film 103C of the belt member each has a size not smaller than the surface of the sheet 2. A slit 103D extending over a length approximately equal to the width of the sheet 2 is formed at the junction between the light shielding belt 103B and the transparent film 103C. Also, engagement holes 103H, 103H for engaging with the engagement claws 40, 40 are formed at said junction. The belt member is applied around a pair of rollers 103F and 103G extending in the width direction of the sheet 2 and secured at both ends to the cassette body 103A. Specifically, the cassette 103 having the sheet 2 housed therein and subjected in this form to image recording at an external image recording apparatus is fitted to the read-out apparatus in such a condition that the opening 103a is covered only by the light shielding belt 103B, and the engagement claws 40, 40 engage with the engagement holes 103H, 103H as shown in FIG. 6A. After the cassette 103 is fitted to the read-out apparatus, it is conveyed by the conveyance means 30 in the direction as indicated by the arrow as mentioned above. Against the conveyance, the engagement claws 40, 40 make the slit 103D and the engagement holes 103H, 103H stand still at the engagement positions. By the conveyance means 30 and the engagement claws 40, 40, the position of the slit 103D is maintained constant, and its position with respect to the sheet 2 is changed. Also, the fitting position of the cassette 103 is determined so that the position where the slit 103D is formed coincides with the incidence position of the stimulating rays 11. In this manner, the belt member comprising the light shielding belt 103B and the transparent film 103B is circulated around the rollers 103F and 103G supported on the cassette body 103A, and the stimulating rays 11 impinge upon the sheet 2 through the slit 103D and two-dimensionally scan nearly the whole surface of the sheet 2 moving in the direction as indicated by the arrow. As the image read-out by the scanning with the stimulating rays 11 advances, the sheet 2 is gradually covered by the transparent film 103C. As shown in FIG. 6B, when the image read-out is finished, the sheet 2 is covered by the transparent film 103C over the whole surface. Since the engagement claws 40, 40 are released when the cassette 103 is conveyed from the read-out section 10 and the transparent film 103C is permeable to light, the cassette 103 is sent in this condition to the erasing section 20, and subjected to erasing. After the erasing is finished, the cassette 103 is ejected into the tray 4 in the same manner as the cassette body 3A mentioned above.

When the aforesaid cassette is used, since the cassette body and the light shielding shutter or the light shielding belt are formed integrally with each other, cassette processing becomes very easy. In either case where the cassette shown in FIG. 3 or the cassette shown in FIG. 4 is used, the cassette conveyance system in the apparatus may also be disposed in any direction other than horizontal. It is also possible to fabricate the erasing section in a size capable of housing the whole cassette, and to switch the cassette after erasing back to the inlet side of the apparatus without ejecting the cassette into the tray. At this time, when the cassette shown in FIG. 3 is used, the light shielding shutter 3B may be pulled out of the apparatus before the cassette body 3A is returned to the inlet. Or, the apparatus may be provided with a mechanism for automatically fitting the light shielding shutter 3B to the cassette body 3A when the cassette body 3A is returned to the inlet side. As the movement means for moving the light shielding shutter or the belt member, any means other than the engagement claws, for example, a magnet or a suction cup, may also be used insofar as it can temporarily secure the light shielding shutter or the belt member. In the case where the read-out apparatus is constituted so that the scanning of the stimulating rays in the sub-scanning direction normal to the deflection by the light deflector is conducted by moving the stimulating ray side instead of moving the sheet, the cassette body may be secured at the read-out section, and the belt member may be circulated in synchronization with the movement of the stimulating rays in the sub-scanning direction so that the scanning position of the stimulating rays coincides with the position of the slit. The configuration of the sheet supporting means in the cassette is not limited to the platelike member, and any member may be used for this purpose insofar as it can support the sheet at the position overlapping the opening of the cassette body.

I claim:

1. A radiation image read-out apparatus for scanning a stimulable phosphor sheet, which has been subjected to image recording in the form housed in a cassette, with stimulating rays which cause said stimulable phosphor sheet to emit light in proportion to the stored radiation energy, and photoelectrically detecting the emitted light to read out a radiation image stored on said stimulable phosphor sheet, the radiation image read-out apparatus comprising:
   (i) conveyance means for conveying a cassette, said cassette including a cassette body for housing said stimulable phosphor sheet and a light shielding shutter slideable on said cassette body in a direction normal to the scanning direction of said stimulating rays, and
   (ii) shutter movement means for moving said light shielding shutter with respect to said cassette body to expose said stimulable phosphor sheet to said rays.

2. An apparatus as defined in claim 1 wherein said conveyance means comprises guide plates and conveying rollers.

3. An apparatus as defined in claim 1 wherein said shutter movement means is disposed in the vicinity of an inlet of said apparatus where a leading end of said light shielding shutter is positioned when said cassette is fitted to said apparatus.

4. An apparatus as defined in claim 3 wherein said shutter movement means comprises engagement claws for engaging with engagement holes formed in said light shielding shutter.

5. An apparatus as defined in claim 1 further comprising a tray disposed at an outlet of said apparatus for receiving said cassette body conveyed by said conveyance means out of said apparatus.

6. An apparatus as defined in claim 1 wherein said light shielding shutter is constituted by a light shielding belt having a size not smaller than the surface of said stimulable phosphor sheet, and said light shielding belt is joined with a transparent film having a size not smaller than the surface of said stimulable phosphor sheet so that said light shielding belt and said transparent film form a ringlike belt member surrounding front and rear surfaces of said stimulable phosphor sheet.

7. An apparatus as defined in claim 6 wherein said belt member is provided with a slit formed at the junction between said light shielding belt and said transparent film, and is circulatable and moveable around said stimulable phosphor sheet.

8. An apparatus as defined in claim 7 wherein said belt member is also provided with engagement holes formed at said junction between said light shielding belt and said transparent film for engagement with engagement claws provided as said shutter movement means.

9. A cassette for housing a stimulable phosphor sheet for storing an image thereon, the cassette comprising:
   (i) a cassette body for housing said stimulable phosphor sheet and having an opening of a size capable of exposing the whole surface of said stimulable phosphor sheet,
   (ii) a sheet supporting means for supporting said stimulable phosphor sheet at the position of said opening, and
   (iii) a belt member disposed in said cassette body, composed of a light shielding belt having a size not smaller than the surface of said stimulable phosphor sheet, and a transparent film having a size not smaller than the surface of said stimulable phosphor sheet, said light shielding belt and said transparent film being joined to constitute a ringlike form and surround front and rear surfaces of said stimulable phosphor sheet, and provided with a slit formed at the junction between said light shielding belt and said transparent film, said belt member being circulatable and moveable around said stimulable phosphor sheet.

10. A cassette as defined in claim 9 wherein said belt member is further provided with engagement holes formed at said junction between said light shielding belt and said transparent film for engagement with engagement claws for moving said belt member.

* * * * *